Feb. 25, 1969 A. L. AXELSON 3,430,208

ARRANGEMENT FOR DETERMINING BIT POSITION OF LEAST SIGNIFICANT BIT HAVING A PREDETERMINED VALUE

Filed Aug. 12, 1966 Sheet 1 of 2

INVENTOR
A. L. AXELSON
BY Daniel E. Nester
ATTORNEY

United States Patent Office 3,430,208
Patented Feb. 25, 1969

3,430,208

ARRANGEMENT FOR DETERMINING BIT POSITION OF LEAST SIGNIFICANT BIT HAVING A PREDETERMINED VALUE

Allen L. Axelson, Keyport, N.J., assignor to Bell Telephone Laboratories, Incorporated, Murray Hill, N.J., a corporation of New York Filed Aug. 12, 1966, Ser. No. 572,053
U.S. Cl. 340—172.5 17 Claims
Int. Cl. G11b *13/00*

ABSTRACT OF THE DISCLOSURE

Disclosed herein is an arrangement for determining logically the least significant bit position in a data word or a selected portion thereof which contains a data bit of a predetermined value. The data word is stored in its original form in a first register and in a modified form in a second register. The original and the modified data words are combined logically to produce a resultant data word having a single binary "1" in the bit position corresponding to the least significant bit positon of the original data word which contains a data bit of the predetermined value.

Figure 1:
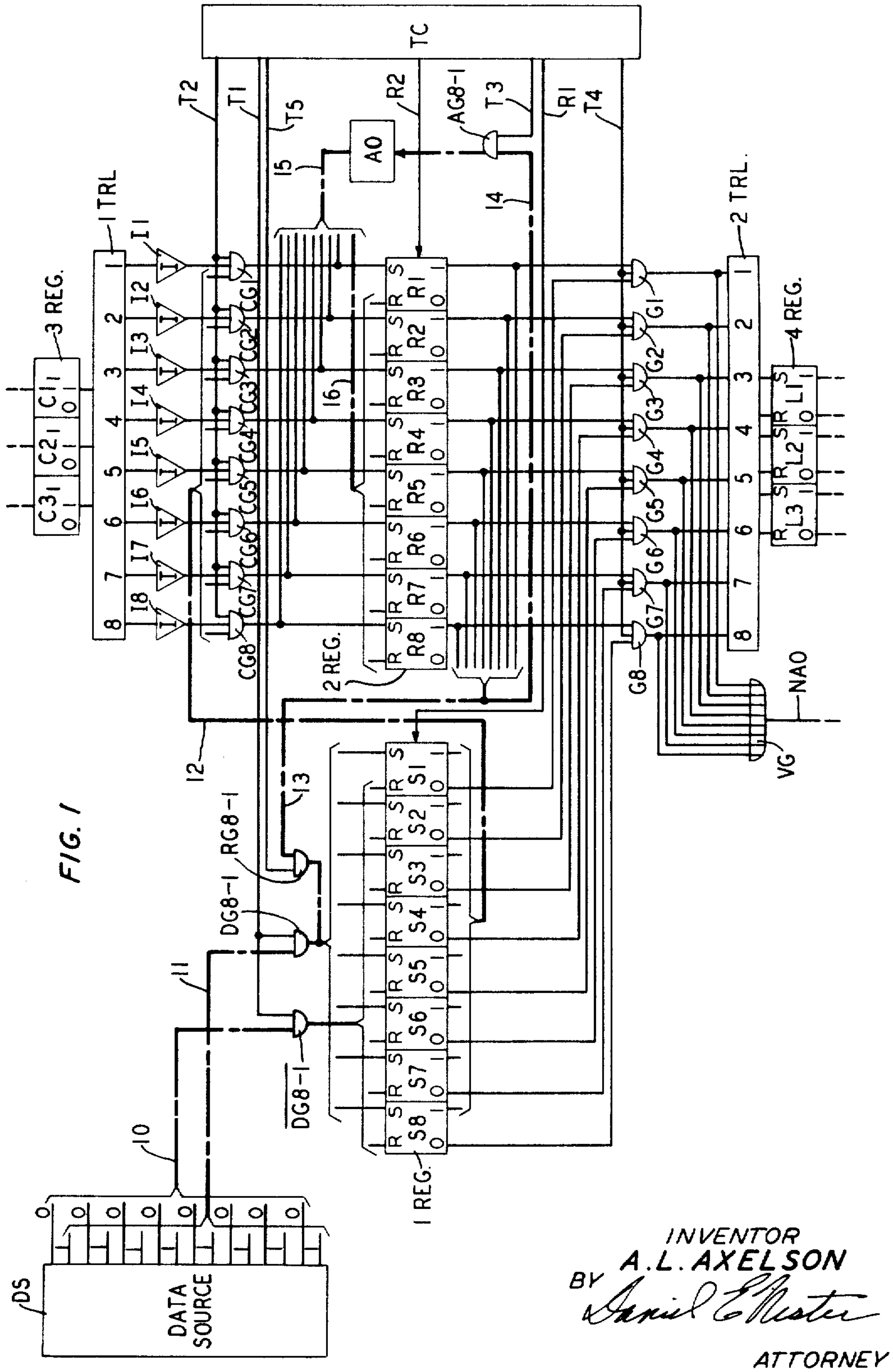

My invention is directed generally to data processing arrangements and particularly to an arrangement for determining logically the least significant bit position in a data word or a selected portion thereof which contains a data bit of a predetermined value.

The detection of at least one data bit of a predetermined value within a data word and the determination and definition of the least significant data bit of the data word having the predetermined value are known data processing measures. These measures presently are utilized in many ways during the performance of various data processing activities. One illustrative example is the selection of an idle one of a group of circuit elements; each respective circuit element being represented by a corresponding data bit of a data word. The busy-idle state of each circuit element is identified by the value of the corresponding data bit in the data word. One binary value (e.g., 1) can indicate a busy circuit element and another binary value (e.g., 0) can indicate an idle circuit element. Detection of at least one data bit having an idle-element value within the data word indicates that at least one circuit element of the group is idle and is available for selection. If a plurality of circuit elements in the group are indicated to be idle, selection of one of the idle circuit elements is accomplished by determining and defining the least significant data bit in the data word whose value indicates an idle circuit element. The binary value of the data bit corresponding to the selected idle circuit element can then be changed to indicate that the selected circuit element no longer is available for selection.

A brief discussion of this data processing technique as it can be used to advantage within a program controlled telephone switching system is presented in an article entitled The Control Unit by A. H. Doblmaier appearing at page 222 et seq. of the June 1965 Bell Laboratories Record, particularly at page 225. In the description presented in that publication, the least significant binary 1 within a data word is sought. In the event that complementary binary values are used, determination of the position of the least significant binary 0 within a data word is an equally advantageous technique. Other representative areas in which similar data processing techniques can be applied advantageously include, inter alia, the analysis of maintenance test results within a data processing system, the sequential processing of service demands from various items of peripheral equipment and the assignment of priority classification to processing demands in accordance with their source.

Logic circuits presently used to implement the data processing techniques discussed above include at least one logic gate per bit position of the data word examined. The respective output of each of these gates is arranged so as to inhibit the outputs of those other logic gates which are associated with the more significantly located data bits of the data word being examined. In this type of logic circuit configuration, the logic gates associated with each bit of a data word are equipped with a large plurality of inputs; the number of inputs to each gate increasing as the significance of the data bit position with which a logic gate is associated increases. As a result, unwieldy and complicated circuit arrangements are presented which require time consuming and complex maintenance routines to verify proper circuit operation.

It is an object of my invention to simplify the logic circuitry required to determine and logically define the position of the least significant data bit of a predetermined value within a data word.

In many of the applications of the above described data processing techniques, it is advantageous to limit selectively the number of data bits within a data word which are examined and to determine the position of the least significant bit of a predetermined value within only the selected group of data bits. For example, this technique can be employed advantageously where different types of circuit elements are respectively represented in different portions of a data word.

It is a further object of my invention to determine and logically define the position of the least significant data bit of a predetermined value within a selected portion of a data word by means of minimal logic circuitry.

These and other objects of my invention are attained in one illustrative embodiment thereof wherein a data word is stored in its original form in a first register and in a modified form in a second register. The original and the modified data words are combined logically to produce a resultant data word which includes a single binary 1 in the bit position corresponding to the least significant bit position of the original data word which contains a data bit of a predetermined value. The value of the defined data bit of the original data word can then be changed so that the process can be repeated to determine the next least significant bit of the predetermined value in the original data word.

In accordance with a feature of one embodiment of my invention, a data word is placed in two registers A and B; the value of the data word in register B is increased by 1; and the logical AND function of the logical complement of the original data word in register A and the modified data word in register B is derived. The resultant of the logical AND function contains a single binary 1 in the bit position corresponding to the least significant bit position of the original data word which contains a binary 0.

In accordance with a feature of another embodiment of my invention, a data word is placed in a register A; the logical complement of the content of the register A is increased by a value of 1; and the result is stored in another register B. The logical AND function of the content of the two registers A and B is then derived and the resultant thereof contains a single binary 1 in the bit position corresponding to the least significant bit position of the original data word which contains a binary 1.

In accordance with a further feature of my invention, a portion of a data word can be selected for examination in accordance with control information placed in a control register defining the most significant bit position of the data word to be examined which is pertinent to the particular data processing operation currently being performed. The data bit in register B corresponding to the bit position defined by the control information is arbitrarily given a value of binary 0 before the value of the entire content of register B is increased by 1 as described above. This action logically inhibits the detection and definition of a data bit of the predetermined value which is present in any bit position of the original data word which has a more significant position in the data word than the bit position defined by the control information.

Figure 2:
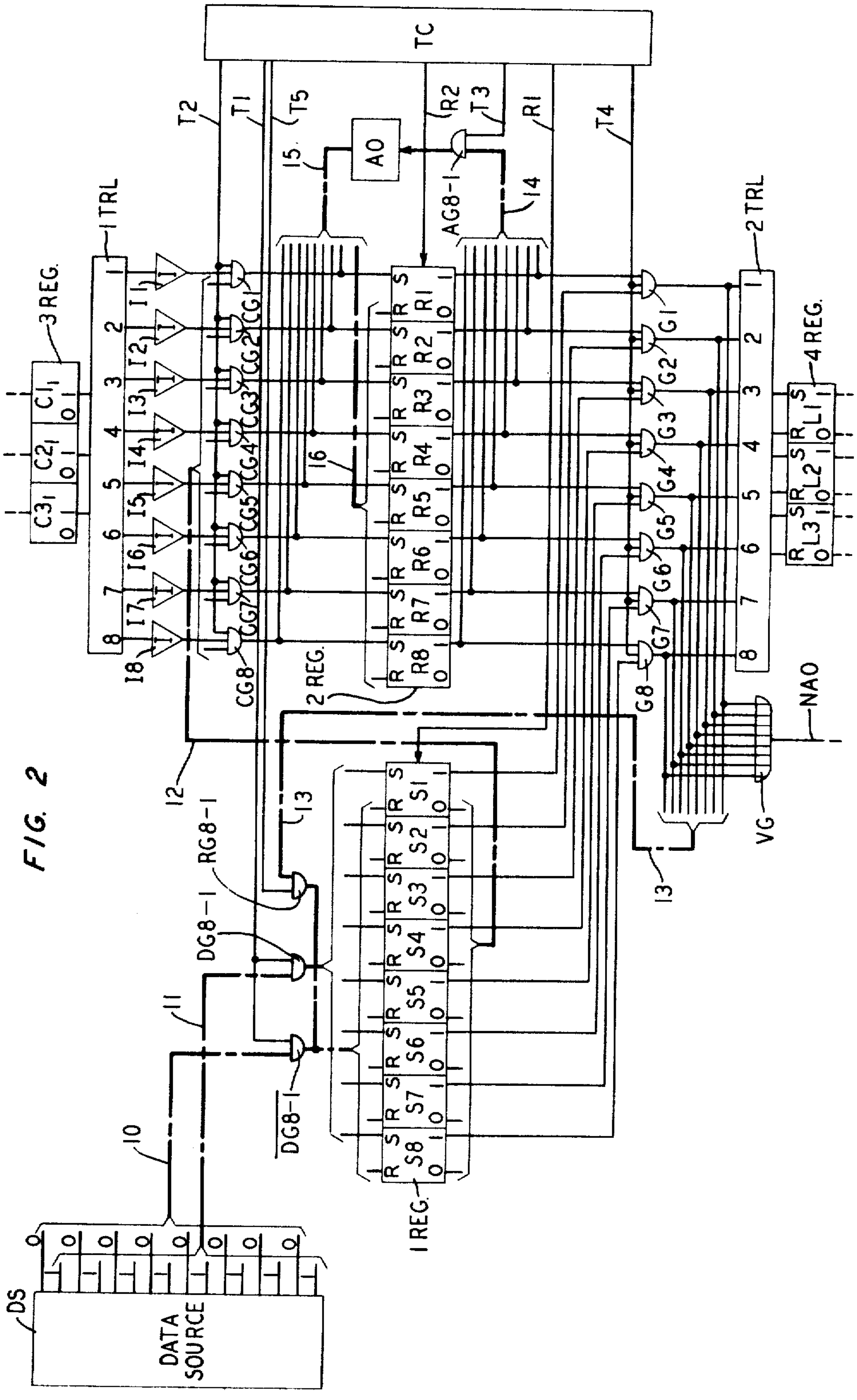

These and other objects and features of my invention will be more apparent from a consideration of the following description when read in conjunction with the drawing in which:

FIG. 1 schematically represents one embodiment of my invention which detects and defines the least significant binary 0 within a selected portion of a data word; and FIG. 2 schematically represents another embodiment of my invention which detects and defines the least significant binary 1 within a selected portion of a data word.

Circuit elements

The logic circuit elements incorporated in the schematic representations of both FIGS. 1 and 2 are well known in the data processing art and no detailed description thereof is included herein. For simplicity, cables including a plurality of conductors are used in the drawing to indicate parallel connections between the respective inputs and outputs of various elements of the drawing. Where such cables are indicated, a single, heavy weight, logical gate symbol is used to represent a plurality of logical gates including one gate for each conductor of the cable. A single gating control lead is shown for such gate symbols which, when energized, will enable all the gates represented by the single symbol. For example, the 1 output terminal of each of the respective flip-flops R8–R1 in register 2REG in FIG. 1 is connected through a cable 13 and a symbolic AND gate RG8–1 to the SET terminal of the corresponding flip-flop S8–S1 in register 1REG. Cable 13 includes a conductor from each respective flip-flop in register 2REG. Symbolic AND gates RG8–1 includes an AND gate for each of these conductors whose output is connected to the SET terminal of the corresponding flip-flop in register 1REG. Control conductor T5 serves as the other input conductor to each of the AND gates RG8–1. Accordingly, a signal on control conductor T5 will gate the information on the respective conductors of cable 13 through AND gates RG8–1 to the corresponding SET terminals of register 1REG, causing the information represented on the respective flip-flop output terminals of register 2REG to be gated into the corresponding flip-flops of register 1REG.

Inverters I8–I1 in FIG. 1 include one inverter for each respective output conductor of translator 1TRL. The output of each of the inverters I8–I1 is connected as an input to a corresponding one of AND gates CG8–CG1. Inverters I8–I1 serve to logically complement the respective output signals from translator 1TRL in the well known manner.

Add-one-circuit AO, which is connected between the output and input terminals of register 2REG, logically operates upon a multibit binary input to increase the value of that input by 1 and to provide a double-rail multibit output defining the increased value. Such logic circuits are well known in the data processing art and will not be further described herein.

The registers 1REG, 2REG, 3REG and 4REG each include a pluraliy of individual flip-flop registers, such as S8–S1 in register 1REG, arranged in a sequential order of decreasing significance. Each flip-flop can be SET to a value of binary 1 or RESET to a value of binary 0 respectively by signals on the SET and RESET terminals of the flip-flop. The 1 output terminal of each flip-flop represents the true value of the data bit stored in the flip-flop. It is energized to indicate a binary 1 when the flip-flop is SET, and it is deenergized to indicate a binary 0 when the flip-flop is RESET. The 0 output terminal of each flip-flop represents the logical complement of the true value of the data bit stored in the flip-flop. It is deenergized to indicate a binary 0 when the flip-flop is SET, and it is energized to indicate a binary 1 when the flip-flop is RESET. Such flip-flops are well known in the prior art.

Translator 1TRL logically converts a 3-bit binary input to a corresponding one-of-eight output. In other words, in response to a combination of signals on its three input conductors from the respective flip-flops C3–C1 of register 3REG, translator 1TRL will provide a signal only on a selected one of its eight output conductors to one of the inverters I8–1. For example, an input of 010 to translator 1TRL will produce a data output of 00000010. Translator 2TRL logically converts a one-of-eight data input to a corresponding 3-bit binary output. In other words, in response to a signal on one of its eight input conductors from AND gates G8–G1, translator 2TRL selectively applies an output signal to one conductor in each of its three pairs of output conductors to provide a 3-bit data word defining the one energized input conductor for registration in register 4REG. For example, an input of 00000010 to translator 2TRL will produce a data output of 010 by energizing the RESET terminal of flip-flop R3, the SET terminal of flip-flop R2 and the RESET terminal of flip-flop R1. Such translators are well known and will not be described in detail herein.

Data source DS can comprise any source of data represented in multibit binary word form. No detailed description of data source DS is given herein.

Timing control TC provides the control signals which determine the sequence of operation of the logic circuits. Timing control TC can comprise any well known wired logic sequencing circuit, program controlled circuit or combination thereof.

DETAILED DESCRIPTION

Determination of least significant binary 0 in entire data word—FIG. 1

When timing control TC places a signal on control conductor T1, the respective bits of a multibit data word from data source DS are gated on a double-rail basis over the conductors of cables 10 and 11 through AND gates DG8–1 and DG8–1 to the RESET and SET terminals of the respective flip-flops S8–S1 of register 1REG. The data word to be examined is thereby stored in register 1REG. For purposes of illustration, it is assumed that this data word is 10011111.

The control information in register 3REG defines the most significant bit of the data word whose value is pertinent to the operation being performed. When the entire data word is to be examined, the most significant bit whose value is pertinent is the bit in the eighth or last bit position of the data word. Since in the illustration being described the entire data word is to be examined, the control information placed in control register 3REG is 000 which defines in binary form the eighth or most significant bit position of the entire data word.

The 1 output terminals of the respective flip-flops C3–C1 of control register 3REG provide input signals to translator 1TRL. As described earlier herein, translator 1TRL provides a one-of-eight data output to inverters I8–I1 in accordance with the 3-bit binary input from register 3REG. Accordingly, transistor 1TRL will energize only its eighth output conductor, which corresponds to the binary information 000 in register 3REG. All other output conductors of translator 1TRL remain unenergized. Thus the output from translator 1TRL is 10000000. As a result of the complementing function of inverters I8–I1, the output 10000000 from translator 1TRL becomes 01111111 and input signals are provided to each of the AND gates CG8–CG1 except AND gate CG8. AND gate CG8 corresponds to the eighth bit position which is the bit position defined by the control information 000 present in register 3REG.

The 1 output terminal of each respective flip-flop S8–S1 of register 1REG is connected through cable 12 to a second input terminal of the corresponding one of the AND gates CG8–CG1. Therefore, each flip-flop S8–S1 of register 1REG containing a binary 1 (i.e., in a SET state) causes a signal to be applied to a second input terminal of the corresponding one of the AND gates CG8–CG1. Accordingly, in the illustration being described, only AND gates CG8, CG5, CG4, CG3, CG2 and CG1 have signals applied to their respective sceond input terminals since only flip-flops S8, S5, S4, S3 and S1 contain binary 1's.

When control conductor T2 is energized by timing control TC, the third input terminal of each of the AND gates CG8–CG1 is energized. At this time, each of the AND gates CG8–CG1 having all three of its inputs energized, i.e., CG5, CG4, CG3, CG2 and CG1, will provide an output signal to the SET terminal of the corresponding flip-flops R5, R4, R3, R2 and R1 in register 2REG causing it to be SET. It is assumed that all flip-flops R8–R1 of register 2REG initially contain binary 0's (i.e., are in a RESET state).

As indicated above, since AND gate CG8 is not enabled from translator 1TRL and no output signal is provided by AND gate CG8, the information stored in flip-flop R8 will be a binary 0 regardless of the value of the data bit stored in flip-flop S8 of register 1REG. Accordingly, the information now stored in flip-flops R8–R1 of register 2REG is 00011111.

The 1 output terminals of each flip-flop R8–R1 in register 2REG are connected in parallel through cable 14 and AND gates AG8–1 to add-one-circuit AO. Accordingly, when control conductor T3 is energized by timing control TC, the content 00011111 of register 2REG is transmitted through AND gates AG8–1 to add-one-circuit AO. As noted above, and-one-circuit AO increases the value of input data applied thereto by 1 and provides output signals representing the modified input data. Accordingly, a value of 1 is added to the content of register 2REG and signals representing the resulting data are applied through cables 15 and 16 to the respective SET and RESET terminals of the flip-flops R8–R1 of register 2REG to store the resulting data therein. In this manner the content of register 2REG is increased by a value of 1 and becomes 00100000.

As noted above, each of the flip-flops S8–S1 in register 1REG provides an output signal on its 1 output terminal when a binary 1 is stored therein (i.e., a SET condition) and provides a signal on its 0 output terminal when a binary 0 is stored therein (i.e., a RESET condition). Accordingly, the information on the 0 output terminals is the logical complement of the information on the corresponding 1 output terminals. Thus, assuming the presence of a signal to be a binary 1 and the absence of a signal to be a binary 0, the output information on the respective 0 output terminals of the flip-flops S8–S1 in register 1REG can be represented by 01100000, which is the logical complement of the original data word 10011111 stored in register 1REG.

The 0 output terminal of each flip-flop S8–S1 of register 1REG is connected to one input terminal of the corresponding one of the AND gates G8–G1. The 1 output terminal of each flip-flop R8–R1 of register 2REG is connected to a second input terminal of the corresponding one of the AND gates G8–G1. When control conductor T4 is energized by timing control conductor TC, the third input terminal of all the AND gates G8–G1 is energized. The resulting data output which appears on the output terminals of AND gates G8–G1 is the logical AND function of the true value of the information present in register 2REG combined with the logical complement of the information present in register 1REG. This resultant is derived as indicated below:

$$(\overline{S8\text{–}S1})(R8\text{–}R1)=(G8\text{–}G1)$$

$$\begin{array}{l}(\overline{S8\text{–}S1})=01100000\\(R8\text{–}R1)=00100000\\\hline(G8\text{–}G1)=00100000\end{array}$$

The resultant data word provided by AND gates G8–G1 includes only a single binary 1 whose bit position (6) corresponds to and defines the least significant bit position of the original data word 10011111 which contains a binary 0.

As indicated above, AND gate G6 is the only one of the AND gates G8–G1 which will provide an output signal. This one-of-eight indication 00100000 is logically translated by translator 2TRL into a corresponding double-rail 3-bit binary indication 110. The respective flip-flops L3–L1 of register 4REG are conditioned in response to the double-rail output signals from translator 2TRL. Accordingly, the data stored in register 4REG at this time is 110, which defines in binary form the sixth bit position of the original data word.

Since at least one of the AND gates G8–G1 provides an output signal, OR gate VG will energize its output conductor NAO. OR gate VG is used to detect the condition wherein all of the data bits in the original data word are binary 1's. In this situation, an ambiguous ouput indication is provided by translator 2TRL since either a signal from only AND gate G8 or an absence of signals from all of the AND gates G8–G1 will result in the output word 000. To resolve this ambiguity, a signal from OR gate VG on its output conductor NAO indicates that a signal is being transmitted from at least one of the AND gates G8–G1.

The respective 1 output terminals of the flip-flops R8–R1 of register 2REG are connected in parallel through cable 13 and through AND gates RG8–1 to the SET terminals of the corresponding flip-flops S8–S1 of register 1REG. When control conductor T5 is energized by timing control TC, AND gates RG8–1 transmit any signals present on the respective conductors of cable 13, which signals cause the corresponding flip-flops S8–S1 to be SET. In this way, the least significant binary 0 stored in register 1REG is changed to a binary 1. Under the illustrative conditions described above, the 1 output terminal of flip-flop R6 has a signal present thereon since the data word contained in register 2REG is 00100000. This signal is applied over cable 13 through AND gates RG8–1 to the SET terminal of the corresponding flip-flop S6 of register 1REG. Flip-flop S6, which contains the least significant binary 0 of the original data word, is in a RESET condition and will be SET by the signal from flip-flop R6 of register 2REG. As a result, the least significant binary 0 stored in register 1REG is changed to a binary 1. The resultant word in register 1REG is the logical OR function of the contents of register 2REG and 1REG. This is derived as follows:

$$\begin{array}{ll}(S8\text{–}S1\ \text{resultant})=(S8\text{–}S1\ \text{original})+(R8\text{–}R1) & \\(S8\text{–}S1\ \text{original}) & =10011111\\(R8\text{–}R1) & =00100000\\\hline(S8\text{–}S1\ \text{resultant}) & =10111111\end{array}$$

As will be described later herein, the output signals from the AND gates G8–G1 also can be used in a similar way to change the value of the defined least significant bit in register 1REG.

A signal on control conductor R2 from timing control TC causes all the flip-flops R8–R1 of register 2REG to be RESET. This prepares the circuit for another examination of the content of register 1REG to determine and define the bit position of the next least significant binary 0 of the original data word contained in register 1REG. If only one examination is required, a signal from timing control TC on conductor R1 will cause all of the flip-flops S8–S1 of register1REG to be RESET. This action prepares register 1REG to receive another data word from data source DS for examination.

Definition of least significant binary 0 in selected portion of data word—FIG. 1

It is assumed, for purposes of this illustration, that control register 3REG now contains information which indicates that only the four least significant bits of a data word are meaningful and pertinent to the operation being performed. Accordingly, only those four least significant bits will be examined. For illustrative purposes, the content of control register 3REG is assumed to be 100 which defines the fourth bit position of the data word to be examined as the most significant bit position whose value is pertinent.

The 1 output terminals of the respective flip-flops C3–C1 of control register 3REG provide input signals to translator 1TRL. As described earlier herein, translator 1TRL provides a one-of-eight output to inverters I8–I1 in accordance with a 3-bit binary input from register 3REG. Accordingly, translator 1TRL will energize only its fourth output conductor which corresponds to the binary information 100 in register 3REG. All other output conductors of translator 1TRL remain unenergized. Thus the data output from translator 1TRL is 00001000. As a result of the complementing function of inverters I8–I1, the output 00001000 from translator 1TRL becomes 11110111 and input signals are provided to each of the AND gates CG8–CG1 except AND gate CG4. AND gate CG4 corresponds to the fourth bit position which is the bit position defined by the control information in register 3REG.

Assuming that the same data word as before is gated from data source DS through AND gates DG8–1 and $\overline{\text{DG8–1}}$ to register 1REG, the content of register 1REG is 10011111.

In response to a signal on control conductor T2 from timing control TC, one input of each of the AND gates CG8–CG1 is energized. A second input of each of the AND gates CG8–CG1 except AND gate CG4 is energized as described above, by the complemented one-of-eight output from translator 1TRL. As a result, the true value of the bits stored in each of the flip-flops S8–S1 except flip-flop S4 will be gated through the corresponding AND gates CG8–CG1 and registered in the corresponding flip-flops R8–R1 of register 2REG. Since no output signal is provided by AND gate CG4, the information stored in flip-flop R4 will be a binary 0 regardless of the value of the data bit stored in the corresponding flip-flop S4 of register 1REG. Accordingly, the information now stored in flip-flops R8–R1 of register 2REG is 10010111.

As described earlier herein, in response to a signal from timing control TC on control conductor T3, AND gates AG8–1 are energized and a value of 1 is added by add-one-circuit AO to the content register 2REG. Accordingly, the data word in register 2REG is modified to be 10011000.

The arbitrary placing of a binary 0 in the fourth bit position R4 of register 2REG inhibited the carry of a binary 1 beyond that fourth bit position. This insures that the fourth bit position of register 2REG has a binary 1 therein after the addition of 1 to the value of the entire word.

As previously described, when control conductor T4 is energized by timing control TC, the complement of the data word in register 1REG and the true value of the data word in register 2REG are logically combined by AND gates G8–G1 to derive the AND function thereof. As a result, the output data from AND gates G8–G1 assumes the following form:

$$(\text{R8–R1})(\overline{\text{S8–S1}}) = (\text{G8–G1})$$

$$(\text{R8–R1}) = 10011000$$
$$(\overline{\text{S8–S1}}) = 01100000$$
$$\overline{\qquad\qquad\qquad}$$
$$(\text{G8–G1}) = 00000000$$

Where no signals are provided from any of the AND gates G8–G1, no output signal is provided by OR gate VG on its output conductor NAO. This indicates that no binary 0's were present in the portion of the data word examined. Translator 2TRL, as described earlier, translates the one-of-eight output 00000000 from AND gates G1–G8 into a corresponding 3-bit binary output 000 which is stored in register 4REG. The ambiguity of this information is resolved by the absence of a signal from conductor NAO. Accordingly, a complete indication is given that the portion of the data word selected for examination contains no binary 0's.

The remaining operations in preparing the circuit to examine additional data words are identical to those described above.

Determination of least significant binary 1 in entire word—FIG. 2

FIG. 2 illustrates a slight modification to the circuitry shown in FIG. 1 whereby the least significant binary 1 in a data word is determined and defined. Identical designations are given to the elements of FIG. 2 as were given to corresponding elements of FIG. 1 so as to facilitate comparison between the circuitry of FIG. 2 and that of FIG. 1.

For purposes of illustration, it is assumed that the data word gated from data source DS through AND gates DG8–1 and $\overline{\text{DG8–1}}$ into flip-flops S8–S1 of register 1REG in response to a signal from timing control TC on conductor T1 is 01100000. It is further assumed that the control information in flip-flops C3–C1 of register 3REG is 000, indicating that the entire word is to be examined.

Cable 12 of FIG. 2 is connected to the 0 output terminals of the respective flip-flops S8–S1 of register 1REG instead of the 1 output terminals thereof as in FIG. 1. Accordingly, it is the logical complement 10011111 of the original data word contained in register 1REG which is gated to register 2REG when control conductor T2 is energized by timing control TC. As described earlier herein, since the control information 000 in register 3REG indicates that the entire data word is to be examined, input signals to all of the AND gates CG8–CG1 except AND gate CG8 are provided from translator 1TRL through inverters I8–I1. As a result, when the original data word 01100000 in register 1REG is complemented and gated to register 2REG, the data in flip-flops R8–R1 of register 2REG becomes 00011111. Flip-flop R8 remains RESET since AND gate CG8 was not enabled by translator 1TRL.

As described earlier herein, a value of 1 is added to the content of register 2REG by add-one-circuit AO when conductor T3 is energized by timing control TC. Accordingly, the data in register 2REG is modified to be 00100000.

In FIG. 2, the 1 output terminal of each respective flip-flop S8–S1 of register 1REG is connected to an input terminal of the corresponding AND gate G8–G1. (It should be recalled that in FIG. 1 it was the 0 output terminals of flip-flops S8–S1 which were connected to the input terminals of corresponding AND gates G8–G1.) Accordingly, when conductor T4 is energized by timing control TC, it is now the true value of the content of register 1REG and the true value of the content of register 2REG which are logically combined to derive the AND function thereof. Therefore, the data appearing on the output terminals of AND gates G8–G1 of FIG. 2 is as follows:

$$(\text{S8–S1})(\text{R8–R1}) = (\text{G8–G1})$$

$$(\text{S8–S1}) = 01100000$$
$$(\text{R8–R1}) = 00100000$$
$$\overline{\qquad\qquad\qquad}$$
$$(\text{G8–G1}) = 00100000$$

This output data from AND gates G8–G1 contains a single binary 1 in the sixth bit position thereof which corresponds to the least significant bit position of the original data word 01100000 which contains a binary 1.

The one-of-eight output 00100000 from AND gates G8–G1 is translated by translator 2TRL to a 3-bit binary word 110. This word is stored in flip-flops L3–L1 of register 4REG. An output signal is provided on conductor NAO from OR gate VG when an output signal appears on the output terminal of at least one of the AND gates G8–G1. The data 110 contained in register 4REG in combination with the energized condition of conductor NAO defines the sixth bit position of the original data word 01100000 as the least significant bit position which contains a binary 1.

In FIG. 2, cable 13 connects the respective output terminals of AND gates G8–G1 through AND gates RG8–1 to the RESET terminals of the corresponding flip-flops S8–S1 in register 1REG. As indicated above, only AND gate G6 provides a signal on its output terminal. When control conductor T5 is energized by timing control TC, AND gates RG8–1 transmit the signal on the output terminal of AND gate G6 to the RESET terminal of flip-flop S6 in register 1REG causing flip-flop S6 to be RESET and to assume a value of binary 0. As a result, the least significant bit having a value of binary 1 in register 1REG has been changed in value to a binary 0. This can be expressed logically as the resultant of the logical AND function of the content of register 1REG and the complement of the output data from AND gates G8–G1.

$$(\text{S8–S1 resultant}) = (\text{S8–S1 original})(\overline{\text{G8–G1}})$$

$$\begin{array}{ll} (\text{S8–S1 original}) & = 01100000 \\ (\overline{\text{G8–G1}}) & = 11011111 \\ \hline (\text{S8–S1 resultant}) & = 01000000 \end{array}$$

A signal on control conductor R2 from timing control TC causes all flip-flops R8–R1 in register 2REG to be RESET. This prepares register 2REG for another operation. If the next least significant binary 1 present in register 1REG is to be defined, the above actions are repeated. If not, register 1REG is RESET by a signal on conductor R1 from timing control TC to prepare register 1REG for registration of a new data word to be examined.

Definition of least significant binary 1 in selected portion of data word—FIG. 2

It is again assumed that the control information placed in register 3REG indicates that only the four least significant bits of the original data word 01100000 contained in register 1REG are pertinent to the operation being performed. Accordingly, the data placed in flip-flops C3–C1 of control register 3REG is 100. This binary information 100 is translated to a corresponding one-of-eight indication 00001000 by translator 1TRL. The output data 00001000 from translator 1TRL is complemented by inverters I8–I1 and is applied in its complemented form 11110111 to the respective input terminals of the corresponding AND gates CG8–CG1.

When conductor T2 is energized by timing control TC all of the AND gates CG8–CG1 will be activated except AND gate CG4. Thus, when the logical complement 10011111 of the original data word in register 1REG is gated through AND gates CG8–CG1, no output signal will appear on the output terminal of AND gate CG4 regardless of the value of the data bit stored in flip-flop S4 of register 1REG. Flip-flop R4 of register 2REG therefore will remain in a RESET condition to indicate a binary 0. The resulting content of register 2REG is

10010111

When a value of 1 is added to the content of register 2REG in response to a signal on conductor T2 from timing control TC, the modified data word in register 2REG will be 10011000.

When the content of register 1REG is logically combined with the modified content of register 2REG by AND gates G8–G1 in response to a signal on conductor T4 from timing control TC, the resultant data on the output terminals of AND gates G8–G1 is:

$$(\text{R8–R1})(\text{S8–S1}) = (\text{G8–G1})$$

$$\begin{array}{ll} (\text{R8–R1}) & = 10011000 \\ (\text{S8–S1}) & = 01100000 \\ \hline (\text{G8–G1}) & = 00000000 \end{array}$$

In this condition, no output signal appears on the output conductor NAO of OR gate VG. This indicates that signals are absent from the output terminals of all the AND gates G8–G1. As described above, translator 2TRL translates the one-of-eight output information 00000000 from AND gates G8–G1 to a 3-bit binary word 000 which is stored in flip-flops L3–L1 of register 4REG. The combination of the information 000 in register 4REG and the unenergized condition of conductor NAO indicates that no binary 1's were present in the selected portion of the data word examined.

It is to be understood that the above-described arrangements are illustrative of the application of the principles of my invention. Numerous other arrangements utilizing these principles may be devised by those skilled in the art without departing from the spirit and scope of the invention.

What is claimed is:

1. An arrangement for determining and defining the bit position of the least significant binary 0 in a selected portion of a multibit binary data word comprising first and second register means each containing said data word, means for adding 1 to the content of said second register means, and means for combining logically the content of said second register means with the logical complement of the content of said first register means to derive the logical AND function thereof.

2. An arrangement in accordance with claim 1 further comprising third register means containing control information which defines the most significant bit position in said selected portion of said data word, and means for placing a binary 0 in the bit position of said second register means defined by said control information.

3. An arrangement in accordance with claim 2 further comprising means for combining logically the content of said second register means with the content of said first register means to derive the logical OR function thereof and for placing the resultant in said first register means.

4. An arrangement for determining and defining the bit position of the least significant binary 1 in a selected portion of a multibit binary data word comprising first register means containing said data word, second register means, means for transmitting the logical complement of said data word from said first register means to said second register means and for adding a value of 1 thereto, and means for combining logically the content of said first register means with the content of said second register means to derive the logical AND function thereof.

5. An arrangement in accordance with claim 4 further comprising third register means containing control information which defines the most significant bit position in said selected portion of said data word, and means for controlling said transmitting means arbitrarily to transmit a binary 0 to the bit position of said second register means defined by said control information.

6. An arrangement in accordance with claim 5 further comprising means for combining logically the content of said first register means with the complement of said derived logical AND function so as to derive the logical AND function thereof and for storing the resultant in said first register means.

7. A data processing arrangement for determining and defining the bit position of the least significant binary 0 in a multibit data word comprising a first register including a first plurality of binary storage elements, a second register including a second plurality of binary storage elements each corresponding to one said binary storage element of said first register, each said storage element having a true value output terminal for indicating the true binary value of the data bit stored in said storage element and a complement value output terminal for indicating the logical complement of the true binary value of the data bit stored in said storage element, access means for transmitting the respective data bits of said multibit data word to said storage elements of said first register, controllable gating means for connecting said true value output terminal of each said storage element of said first register to an input of the corresponding storage element of said second register so as to transmit the true value of each respective data bit of said multibit data word to said corresponding storage element of said second register, logic means for adding a value of 1 to the data word stored in said second register, a plurality of AND gates each having an output terminal, an input terminal connected to said complement value output terminal of one said storage element of said first register and another input terminal connected to said true value output terminal of the one said storage element of said second register which corresponds to said one storage element of said first register, and control means for enabling selectively said access means, said gating means, said logic means and said AND gates in a predetermined sequence.

8. An arrangement in accordance with claim 7 further comprising means connected to said output terminals of all said AND gates and responsive to a multibit data input having a single binary 1 indication therein for generating a data output word which defines the bit position in said multibit data input of said single binary 1.

9. A data processing arrangement in accordance with claim 7 further comprising a third register containing control information which defines the most significant bit position of said multibit data word in which determination and definition of a binary 0 is pertinent, and means connected between said third register and said controllable gating means and responsive to said control information for controlling selectively said controllable gating means to transmit a binary 0 to the storage element of said second register whose significant position in said second register corresponds to said most significant bit position defined by said control information.

10. A data processing arrangement in accordance with claim 9 further comprising other gating means connected between the true value output terminals of said second register and input terminals of said first register for transmitting a binary 1 to each storage element of said first register which corresponds to a storage element of said second register containing a binary 1.

11. A data processing arrangement in accordance with claim 10 further comprising an OR gate having an input terminal connected to said output terminal of each of said AND gates for providing an output signal in response to a binary 1 indication on said output terminal of any of said AND gates.

12. A data processing arrangement for determining and defining the bit position of the least significant binary 1 in a multibit data word comprising a first register including a first plurality of binary storage elements, a second register including a second plurality of binary storage elements each corresponding to one said binary storage element of said first register means, each said storage element having a true value output terminal for indicating the true binary value of the data bit stored in said storage element and a complement value output terminal for indicating the logical complement of the true binary value of the data bit stored in said storage element, access means for transmitting the respective data bits of said multibit data word to said storage elements of said first register, controllable gating means for connecting said complement value output terminal of each said storage element of said first register to an input of the corresponding storage element of said second register so as to transmit the logical complement of each respective data bit of said multibit data word to said corresponding storage element of said second register, logic means for adding a value of 1 to the data word stored in said second register, a plurality of AND gates each having an output terminal, an input terminal connected to said true value output terminal of one said storage element of said first register and another input terminal connected to said true value output terminal of the one said storage element of said second register which corresponds to said one storage element of said first register, and control means for enabling selectively said access means, said gating means, said logic means and said AND gates in a predetermined sequence.

13. An arrangement in accordance with claim 12 further comprising means connected to said output terminals of all said AND gates and responsive to a multibit data input having a single binary 1 indication therein for generating a data output word which defines the bit position in said multibit data input of said single binary 1.

14. A data processing arrangement in accordance with claim 12 further comprising a third register containing control information which defines the most significant bit position of said multibit data word in which determination of a binary 1 is pertinent, and means connected between said third register and said controllable gating means and responsive to said control information for controlling selectively said controllable gating means to transmit a binary 0 to the storage element of said second register whose significant position in said second register corresponds to said most significant bit position defined by said control information.

15. A data processing arrangement in accordance with claim 14 further comprising other gating means connected between the output terminals of said AND gates and input terminals of said first register for transmitting a binary 0 to each storage element of said first register which corresponds to one of said AND gates having a binary 1 indicated on its output terminal.

16. A data processing arrangement in accordance with claim 15 further comprising an OR gate having an input terminal connected to said output terminal of each of said AND gates for providing an output signal in response to a binary 1 indication on said output terminal of any of said AND gates.

17. An arrangement for determining and defining the bit position of the least significant binary bit of a predetermined value in a multibit binary data word comprising first register means containing said data word, second register means containing the logical complement of said data word, means for adding 1 to the contents of one of said register means, and means for deriving the logical AND function of the contents of said first and second register means after the adding of said 1 to the contents of one of said register means.

References Cited

UNITED STATES PATENTS

| | | | |
|---|---|---|---|
| 2,941,719 | 6/1960 | Gloess et al. | 235—164 |
| 3,319,982 | 11/1965 | Tucker | 340—172.5 |

PAUL J. HENON, *Primary Examiner.*

R. RICKERT, *Assistant Examiner.*